(12) United States Patent
Yang

(10) Patent No.: US 10,103,844 B2
(45) Date of Patent: Oct. 16, 2018

(54) INFORMATION RECEIVING AND SENDING METHOD AND APPARATUS

(71) Applicant: Huawei Technologies Co., Ltd., Shenzhen, Guangdong (CN)

(72) Inventor: Xun Yang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 121 days.

(21) Appl. No.: 15/244,432

(22) Filed: Aug. 23, 2016

(65) Prior Publication Data

US 2016/0359584 A1 Dec. 8, 2016

Related U.S. Application Data

(63) Continuation of application No. PCT/CN2014/072464, filed on Feb. 24, 2014.

(51) Int. Cl.
| | |
|---|---|
| *H04L 1/00* | (2006.01) |
| *H04L 27/26* | (2006.01) |
| *H04L 5/00* | (2006.01) |
| *H04W 72/04* | (2009.01) |

(Continued)

(52) U.S. Cl.
CPC ............ *H04L 1/0091* (2013.01); *H04L 5/001* (2013.01); *H04L 5/0094* (2013.01); *H04L 27/0008* (2013.01); *H04L 27/2602* (2013.01); *H04L 27/2613* (2013.01); *H04L 27/2666* (2013.01); *H04W 52/0216* (2013.01); *H04W 52/0241* (2013.01); *H04W 72/042* (2013.01); *Y02B 60/50* (2013.01); *Y02D 70/00* (2018.01)

(58) Field of Classification Search
CPC ............... H04L 1/0091; H04L 27/0008; H04L 27/2613; H04L 27/2666; H04L 5/001; H04L 5/0094; H04W 52/0216; H04W 52/0241; H04W 72/042; Y02B 60/50
USPC ......................................................... 370/329
See application file for complete search history.

(56) References Cited

U.S. PATENT DOCUMENTS

| | | | | |
|---|---|---|---|---|
| 9,775,147 | B2* | 9/2017 | Kenney | H04W 72/044 |
| 9,853,784 | B2* | 12/2017 | Azizi | H04W 72/0453 |
| 2006/0165196 | A1 | 7/2006 | Montalvo et al. | |

(Continued)

FOREIGN PATENT DOCUMENTS

| | | |
|---|---|---|
| CN | 101015149 A | 8/2007 |
| CN | 103379544 A | 10/2013 |

(Continued)

*Primary Examiner* — Stephen J Clawson

(57) ABSTRACT

An information receiving and sending method and apparatus are provided, where the information receiving method includes: receiving, by a station (STA) in a transmit opportunity (TXOP) phase, orthogonal frequency division multiple access (OFDMA) data that is from a wireless access point (AP), where some data frames in the OFDMA data carry a legacy physical-layer preamble; and in a process of receiving the OFDMA data, working, by the STA, in an OFDMA receiving mode when receiving a data frame that does not carry the legacy physical-layer preamble, determining, by the STA according to a preset rule, a data frame that carries the legacy physical-layer preamble, and switching from the OFDMA receiving mode to an orthogonal frequency division multiplexing (OFDM) receiving mode to receive the data frame that carries the legacy physical-layer preamble.

17 Claims, 3 Drawing Sheets

---

A station STA receives, in a transmit opportunity TXOP phase, orthogonal frequency division multiple access OFDMA data that is from a wireless access point AP, where some data frames in the OFDMA data carry a legacy physical-layer preamble — S101

In a process of receiving the OFDMA data, the STA works in an OFDMA receiving mode when receiving a data frame that does not carry the legacy physical-layer preamble, the STA determines, according to a preset rule, a data frame that carries the legacy physical-layer preamble, and switches from the OFDMA receiving mode to an OFDM receiving mode to receive the data frame that carries the legacy physical-layer preamble — S102

(51) Int. Cl.
*H04L 27/00* (2006.01)
*H04W 52/02* (2009.01)

(56) References Cited

U.S. PATENT DOCUMENTS

| | | | | | |
|---|---|---|---|---|---|
| 2009/0122694 | A1* | 5/2009 | Stephens | ................. | H04L 27/20 370/210 |
| 2010/0260159 | A1* | 10/2010 | Zhang | ................... | H04W 28/06 370/338 |
| 2011/0222486 | A1* | 9/2011 | Hart | ........................ | H04L 5/001 370/329 |
| 2012/0170563 | A1* | 7/2012 | Abraham | ............ | H04L 27/2607 370/338 |
| 2016/0183243 | A1* | 6/2016 | Park | .................. | H04W 72/0413 370/329 |
| 2016/0338115 | A1* | 11/2016 | Liu | ........................ | H04L 5/0044 |
| 2016/0359584 | A1* | 12/2016 | Yang | ................... | H04L 27/2613 |
| 2017/0250785 | A1* | 8/2017 | Zhang | ................... | H04L 1/0079 |

FOREIGN PATENT DOCUMENTS

| | | | |
|---|---|---|---|
| EP | 1798883 | A1 | 6/2007 |
| EP | 3075120 | A1 | 10/2016 |
| EP | 3079322 | A1 | 10/2016 |
| WO | 2011056299 | A2 | 5/2011 |
| WO | 2015081132 | A1 | 6/2015 |

* cited by examiner

INFORMATION RECEIVING AND SENDING METHOD AND APPARATUS

CROSS-REFERENCE TO RELATED APPLICATIONS

This application is a continuation of International Application No. PCT/CN2014/072464, filed on Feb. 24, 2014, which is hereby incorporated by reference in its entirety.

TECHNICAL FIELD

The present invention relates to the field of communications technologies, and in particular, to an information receiving and sending method and apparatus.

BACKGROUND

OFDM (Orthogonal Frequency Division Multiplexing, orthogonal frequency division multiplexing) is a basic transmission manner for current wireless communication, and is widely used in wireless communications systems such as LTE, WiMAX, and WiFi. In addition, the OFDM is further used in fixed network transmission, such as transmission by means of optical fibers, copper strands, or cables. The basic principle of the OFDM is to reduce, within a range allowed by subcarrier orthogonality, a subcarrier interval to the minimum, so as to ensure that multiple parallel paths that do not interfere with each other are formed while frequency utilization efficiency of a system can be improved. If subcarriers, which do not interfere with each other, of the OFDM are allocated to multiple users, the OFDM can be used to implement access or data transmission of the multiple users, and this is OFDMA (Orthogonal Frequency Division Multiple Access, orthogonal frequency division multiple access). However, in the prior art, data transmission efficiency is relatively low in an OFDMA scenario.

SUMMARY

Embodiments of the present invention provide an information receiving and sending method and apparatus, which resolve a technical problem in the prior art that the transmission efficiency in an OFDMA scenario is relatively low.

According to a first aspect, an information receiving method is provided, including:

receiving, by a station STA in a transmit opportunity TXOP phase, orthogonal frequency division multiple access OFDMA data that is from a wireless access point AP, where some data frames in the OFDMA data carry a legacy physical-layer preamble; and in a process of receiving the OFDMA data, working, by the STA, in an OFDMA receiving mode when receiving a data frame that does not carry the legacy physical-layer preamble, determining, by the STA according to a preset rule, a data frame that carries the legacy physical-layer preamble, and switching from the OFDMA receiving mode to an OFDM receiving mode to receive the data frame that carries the legacy physical-layer preamble.

With reference to the first aspect, in a first possible implementation manner, the determining, by the STA according to a preset rule, a data frame that carries the legacy physical-layer preamble includes:

determining, by the STA according to indication information sent by the AP, the data frame that carries the legacy physical-layer preamble.

With reference to the first aspect, in a second possible implementation manner, the determining, by the STA according to a preset rule, a data frame that carries the legacy physical-layer preamble includes:

determining, by the STA according to a rule, which is pre-configured in the STA, for carrying the legacy physical-layer preamble, the data frame that carries the legacy physical-layer preamble.

With reference to the first possible implementation manner of the first aspect, in a third possible implementation manner, the determining, by the STA according to indication information sent by the AP, the data frame that carries the legacy physical-layer preamble includes:

when receiving a current data frame that carries a legacy physical-layer preamble, reading, by the STA, frame length information and rate information from the current legacy physical-layer preamble, where the read frame length information and rate information are indication information that indicates a next data frame that carries a legacy physical-layer preamble; and calculating, by the STA, according to the frame length information and the rate information, a receiving time of the next data frame that carries the legacy physical-layer preamble.

With reference to the first possible implementation manner of the first aspect, in a fourth possible implementation manner, the determining, by the STA according to indication information sent by the AP, the data frame that carries the legacy physical-layer preamble includes:

when receiving a current beacon frame, reading, by the STA, indication information from the current beacon frame, where the indication information is field information that represents an appearance cycle of a data frame that is within a time period of the current beacon frame and that carries the legacy physical-layer preamble; and determining, by the STA according to the field information, a receiving time of the data frame that is within the time period of the current beacon frame and that carries the legacy physical-layer preamble.

With reference to the first possible implementation manner of the first aspect, in a fifth possible implementation manner, the determining, by the STA according to indication information sent by the AP, the data frame that carries the legacy physical-layer preamble includes:

receiving, by the STA, signaling information that is sent by the AP when the AP sends a current data frame that carries the legacy physical-layer preamble, where the signaling information is signaling information that is sent by the AP to the STA when the AP sends the current data frame that carries the legacy physical-layer preamble, and the signaling information includes indication information of a receiving time of a next data frame that carries the legacy physical-layer preamble; and reading, by the STA, the indication information from the signaling information, and determining, according to the indication information, the receiving time of the next data frame that carries the legacy physical-layer preamble.

With reference to the first possible implementation manner of the first aspect, in a sixth possible implementation manner, the determining, by the STA according to indication information sent by the AP, the data frame that carries the legacy physical-layer preamble includes:

when receiving a current data frame, reading, by the STA, indication information from a fixed information bit of the current data frame, where the indication information is a state value of the fixed information bit; and determining, by the STA according to the state value of the fixed information bit, whether a next data frame carries the legacy physical-layer preamble, so as to determine, according to a result of the determining, a receiving time of the next data frame that carries the legacy physical-layer preamble.

According to a second aspect, an information sending method is further provided, including:

configuring, by a wireless access point AP according to a preset rule, that some data frames in to-be-sent OFDMA data carry a legacy physical-layer preamble; and sending, by an AP, the OFDMA data to a station STA, so that the STA works in an OFDMA receiving mode when receiving, in a process of receiving the OFDMA data, a data frame that does not carry the legacy physical-layer preamble, and the STA determines, according to the preset rule, a data frame that carries the legacy physical-layer preamble, and switches from the OFDMA receiving mode to an OFDM receiving mode to receive the data frame that carries the legacy physical-layer preamble.

With reference to the second aspect, in a first possible implementation manner, the configuring, by a wireless access point AP according to a preset rule, that some data frames in to-be-sent OFDMA data carry a legacy physical-layer preamble includes:

configuring, by the AP according to a rule, which is pre-configured in the AP, for carrying the legacy physical-layer preamble, the data frames that carry the legacy physical-layer preamble.

With reference to the second aspect, in a second possible implementation manner, the configuring, by a wireless access point AP according to a preset rule, that some data frames in to-be-sent OFDMA data carry a legacy physical-layer preamble includes:

configuring, by the AP, that some data frames in the to-be-sent OFDMA data carry the legacy physical-layer preamble; and generating, by the AP, indication information of a receiving time of each data frame that carries the legacy physical-layer preamble, and sending the indication information to the STA.

With reference to the second aspect, the first possible implementation manner of the second aspect, or the second possible implementation manner of the second aspect, in a third possible implementation manner, the preset rule further includes: an average appearance frequency of the data frames that carry the legacy physical-layer preamble is greater than a frequency threshold.

According to a third aspect, a receiving apparatus is provided, including:

a receiving unit, configured to receive, in a transmit opportunity TXOP phase, orthogonal frequency division multiple access OFDMA data that is from a wireless access point AP, where some data frames in the OFDMA data carry a legacy physical-layer preamble, and in a process of receiving the OFDMA data, the receiving unit works in an OFDMA receiving mode when receiving a data frame that does not carry the legacy physical-layer preamble;

a determining unit, configured to acquire data frames received by the receiving unit, and determine, according to a preset rule, a data frame that carries the legacy physical-layer preamble; and a switching unit, configured to: when the determining unit determines the data frame that carries the legacy physical-layer preamble, switch the receiving unit from the OFDMA receiving mode to an OFDM receiving mode to receive the data frame that carries the legacy physical-layer preamble.

With reference to the third aspect, in a first possible implementation manner, the determining unit is specifically configured to:

determine, according to indication information sent by the AP, the data frame that carries the legacy physical-layer preamble.

With reference to the third aspect, in a second possible implementation manner, the determining unit is specifically configured to:

determine, according to a rule, which is pre-configured in the determining unit, for carrying the legacy physical-layer preamble, the data frame that carries the legacy physical-layer preamble.

With reference to the first possible implementation manner of the third aspect, in a third possible implementation manner, the determining unit is specifically configured to:

when receiving a current data frame that carries a legacy physical-layer preamble, read frame length information and rate information from the current legacy physical-layer preamble, where the read frame length information and rate information are indication information that indicates a next data frame that carries a legacy physical-layer preamble; and calculate, according to the frame length information and the rate information, a receiving time of the next data frame that carries the legacy physical-layer preamble.

With reference to the first possible implementation manner of the third aspect, in a fourth possible implementation manner, the determining unit is specifically configured to:

when receiving a current beacon frame, read indication information from the current beacon frame, where the indication information is field information that represents an appearance cycle of a data frame that is within a time period of the current beacon frame and that carries the legacy physical-layer preamble; and determine, according to the field information, a receiving time of the data frame that is within the time period of the current beacon frame and that carries the legacy physical-layer preamble.

With reference to the first possible implementation manner of the third aspect, in a fifth possible implementation manner, the determining unit is specifically configured to:

receive signaling information that is sent by the AP when the AP sends a current data frame that carries the legacy physical-layer preamble, where the signaling information is signaling information that is sent by the AP to the receiving unit when the AP sends the current data frame that carries the legacy physical-layer preamble, and the signaling information includes indication information of a receiving time of a next data frame that carries the legacy physical-layer preamble; and acquire the signaling information from the receiving unit, read the indication information from the signaling information, and determine, according to the indication information, the receiving time of the next data frame that carries the legacy physical-layer preamble.

With reference to the first possible implementation manner of the third aspect, in a sixth possible implementation manner, the determining unit is specifically configured to:

when receiving a current data frame, read indication information from a fixed information bit of the current data frame, where the indication information is a state value of the fixed information bit; and determine, according to the state value of the fixed information bit, whether a next data frame carries the legacy physical-layer preamble, so as to determine, according to a result of the determining, a receiving time of the next data frame that carries the legacy physical-layer preamble.

According to a fourth aspect, a sending apparatus is further provided, including:

a configuration unit, configured to configure, according to a preset rule, that some data frames in to-be-sent OFDMA data carry a legacy physical-layer preamble; and a sending unit, configured to send the OFDMA data to a station STA, so that the STA works in an OFDMA receiving mode when receiving, in a process of receiving the OFDMA data, a data frame that does not carry the legacy physical-layer preamble, and the STA determines, according to the preset rule, a data frame that carries the legacy physical-layer preamble, and switches from the OFDMA receiving mode to an OFDM receiving mode to receive the data frame that carries the legacy physical-layer preamble.

With reference to the fourth aspect, in a first possible implementation manner, the configuration unit is specifically configured to:

configure, according to a rule, which is pre-configured in the AP, for carrying the legacy physical-layer preamble, the data frames that carry the legacy physical-layer preamble.

With reference to the fourth aspect, in a second possible implementation manner, the configuration unit is specifically configured to:

configure that some data frames in the to-be-sent OFDMA data carry the legacy physical-layer preamble; and generate indication information of a receiving time of each data frame that carries the legacy physical-layer preamble, and send the indication information to the STA.

With reference to the fourth aspect, the first possible implementation manner of the fourth aspect, or the second possible implementation manner of the fourth aspect, in a third possible implementation manner, the preset rule further includes: an average appearance frequency of the data frames that carry the legacy physical-layer preamble is greater than a frequency threshold.

According to a fifth aspect, a station STA is further provided, including:

a receiver, configured to receive, in a transmit opportunity TXOP phase, orthogonal frequency division multiple access OFDMA data that is from a wireless access point AP, where some data frames in the OFDMA data carry a legacy physical-layer preamble, and in a process of receiving the OFDMA data, the receiver works in an OFDMA receiving mode when receiving a data frame that does not carry the legacy physical-layer preamble; and a processor, configured to: determine, according to a preset rule, a data frame that carries the legacy physical-layer preamble, and switch from the OFDMA receiving mode to an OFDM receiving mode to receive the data frame that carries the legacy physical-layer preamble.

With reference to the fifth aspect, in a first possible implementation manner, the processor is specifically configured to:

determine, according to indication information sent by the AP, the data frame that carries the legacy physical-layer preamble.

With reference to the fifth aspect, in a second possible implementation manner, the processor is specifically configured to:

determine, according to a rule, which is pre-configured in the processor, for carrying the legacy physical-layer preamble, the data frame that carries the legacy physical-layer preamble.

With reference to the first possible implementation manner of the fifth aspect, in a third possible implementation manner, the processor is specifically configured to:

when receiving a current data frame that carries a legacy physical-layer preamble, read frame length information and rate information from the current legacy physical-layer preamble, where the read frame length information and rate information are indication information that indicates a next data frame that carries a legacy physical-layer preamble; and calculate, according to the frame length information and the rate information, a receiving time of the next data frame that carries the legacy physical-layer preamble.

With reference to the first possible implementation manner of the fifth aspect, in a fourth possible implementation manner, the processor is specifically configured to:

when receiving a current beacon frame, read indication information from the current beacon frame, where the indication information is field information that represents an appearance cycle of a data frame that is within a time period of the current beacon frame and that carries the legacy physical-layer preamble; and determine, according to the field information, a receiving time of the data frame that is within the time period of the current beacon frame and that carries the legacy physical-layer preamble.

With reference to the first possible implementation manner of the fifth aspect, in a fifth possible implementation manner, the processor is specifically configured to:

receive signaling information that is sent by the AP when the AP sends a current data frame that carries the legacy physical-layer preamble, where the signaling information is signaling information that is sent by the AP to the receiver when the AP sends the current data frame that carries the legacy physical-layer preamble, and the signaling information includes indication information of a receiving time of a next data frame that carries the legacy physical-layer preamble; and acquire the signaling information from the receiver, read the indication information from the signaling information, and determine, according to the indication information, the receiving time of the next data frame that carries the legacy physical-layer preamble.

With reference to the first possible implementation manner of the fifth aspect, in a sixth possible implementation manner, the processor is specifically configured to:

when receiving a current data frame, read indication information from a fixed information bit of the current data frame, where the indication information is a state value of the fixed information bit; and determine, according to the state value of the fixed information bit, whether a next data frame carries the legacy physical-layer preamble, so as to determine, according to a result of the determining, a receiving time of the next data frame that carries the legacy physical-layer preamble.

According to a sixth aspect, a wireless access point AP is further provided, including:

a processor, configured to configure, according to a preset rule, that some data frames in to-be-sent OFDMA data carry a legacy physical-layer preamble; and a transmitter, configured to send the OFDMA data to a station STA, so that the STA works in an OFDMA receiving mode when receiving, in a process of receiving the OFDMA data, a data frame that does not carry the legacy physical-layer preamble, and the STA determines, according to the preset rule, a data frame that carries the legacy physical-layer preamble, and switches from the OFDMA receiving mode to an OFDM receiving mode to receive the data frame that carries the legacy physical-layer preamble.

With reference to the sixth aspect, in a first possible implementation manner, the processor is specifically configured to:

configure, according to a rule, which is pre-configured in the processor, for carrying the legacy physical-layer preamble, the data frames that carry the legacy physical-layer preamble.

With reference to the sixth aspect, in a second possible implementation manner, the processor is specifically configured to:

configure that some data frames in the to-be-sent OFDMA data carry the legacy physical-layer preamble; and generate indication information of a receiving time of each data frame that carries the legacy physical-layer preamble, and send the indication information to the STA.

With reference to the sixth aspect, the first possible implementation manner of the sixth aspect, or the second possible implementation manner of the sixth aspect, in a third possible implementation manner, the preset rule further includes: an average appearance frequency of the data frames that carry the legacy physical-layer preamble is greater than a frequency threshold.

By means of the technical solutions provided in the embodiments of the present invention, in continuous transmission, some data in OFDMA data sent by an AP carries a legacy physical-layer preamble, where some data frames carry the legacy physical-layer preamble, so that a legacy STA can parse these data frames that carry the legacy physical-layer preamble, and therefore compatibility with the legacy STA is achieved, and overheads of receive power is not obviously increased. In addition, some data frames do not carry the legacy physical-layer preamble, which can reduce a time resource that is occupied during data frame transmission, increasing the transmission efficiency in an OFDMA scenario. The STA determines, according to a preset rule, a data frame that carries the legacy physical-layer preamble and switches to an OFDM receiving mode, and therefore can receive data frames that carry the legacy physical-layer preamble and data frames that do not carry the legacy physical-layer preamble.

DETAILED DESCRIPTION

To resolve technical problems in the prior art that the transmission efficiency in an OFDMA scenario is relatively low and compatibility with a legacy STA cannot be achieved, embodiments of the present invention put forward an information receiving and sending method and apparatus.

To make the objectives, technical solutions, and advantages of the embodiments of the present invention clearer, the following clearly and describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The following describes exemplary implementation manners of the present invention in detail with reference to accompanying drawings.

Embodiment 1

Figure 1:
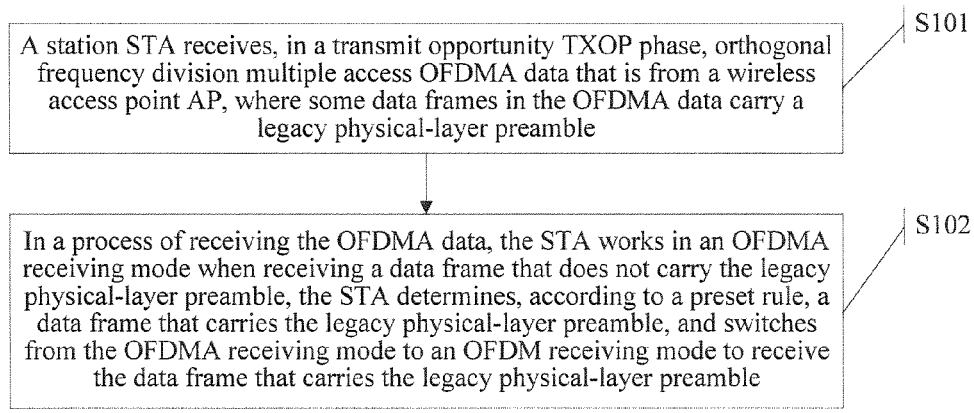
FIG. 1 is a flowchart of an information receiving method according to Embodiment 1 of the present invention.

This embodiment of the present invention provides an information receiving method, which is used in a STA (Station, station or user). Referring to FIG. 1, FIG. 1 is a schematic diagram of an information receiving method according to Embodiment 1 of the present invention. The method includes the following steps:

S101: A station STA receives, in a transmit opportunity TXOP phase, orthogonal frequency division multiple access OFDMA data that is from a wireless access point AP, where some data frames in the OFDMA data carry a legacy physical-layer preamble.

S102: In a process of receiving the OFDMA data, the STA works in an OFDMA receiving mode when receiving a data frame that does not carry legacy physical-layer preamble, the STA determines, according to a preset rule, a data frame that carries the legacy physical-layer preamble, and switches from the OFDMA receiving mode to an OFDM receiving mode to receive the data frame that carries the legacy physical-layer preamble.

The preset rule in S102 may be received indication information sent by the AP, or may be a rule agreed by the AP and the STA.

Figure 2:
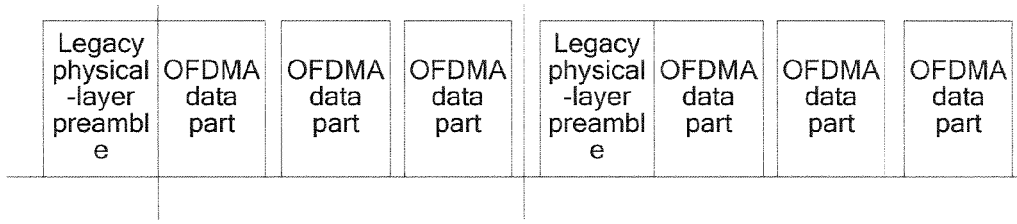
FIG. 2 is a schematic diagram of OFDMA data according to Embodiment 1 of the present invention.

Optionally, if an AP and a STA that are in a system determine, by using an agreed rule, a receiving time of a data frame that carries a legacy physical-layer preamble, the STA pre-configures, in the STA and the AP, a rule for carrying the legacy physical-layer preamble, so that the AP may not send indication information to the STA, that is, the STA determines, according to the rule, which is agreed by the SAT and the AP, for carrying the legacy physical-layer preamble, a data frame that is in OFDMA data and that carries the legacy physical-layer preamble. For example, it is preset in the system that a first data frame carries the legacy physical-layer preamble and that three data frames not carrying the legacy physical-layer preamble are used as an interval for carrying the legacy physical-layer preamble. In this case, the AP generates OFDMA data according to the preset rule, where a format of the OFDMA data is shown in FIG. 2, and according to the same preset rule that is agreed, that is, the rule defining that a first data frame carries the legacy physical-layer preamble and that three data frames not carrying the legacy physical-layer preamble are used as an interval for carrying the legacy physical-layer preamble, the corresponding STA determines a data frame that carries the legacy physical-layer preamble and that is in the OFDMA data, so that an operating mode of the STA is switched between an OFDMA receiving mode and an OFDM receiving mode, to receive data frames that carry the legacy physical-layer preamble and data frames that do not carry the legacy physical-layer preamble.

Optionally, if the STA determines, according to indication information sent by the AP, the data frame that carries the legacy physical-layer preamble, the indication information may have multiple implementation forms. The following describes the implementation forms of the indication information by using examples.

Implementation manner 1: A legacy physical-layer preamble includes frame length information (length) and rate information (rate), and therefore frame length information and rate information that are in a current legacy physical-layer preamble are used to indicate a receiving time of a next data frame that carries a legacy physical-layer preamble.

Specifically, in a current data frame that carries a legacy physical-layer preamble and that is sent by the AP to the STA, the legacy physical-layer preamble includes frame length information and rate information. Correspondingly, the STA receives the current data frame that carries the legacy physical-layer preamble, reads the frame length information and the rate information from the received current legacy physical-layer preamble, and calculates, according to a relationship of "time=frame length/rate", a receiving time, which is indicated by the current legacy physical-layer preamble, of a next data frame that carries a legacy physical-layer preamble.

It can be seen from the implementation manner 1 that, a receiving time of a next data frame that carries a legacy physical-layer preamble is learned by reading each received current legacy physical-layer preamble, so that a receiving time of each data frame that carries a legacy physical-layer preamble can be determined. In this way, switching to an OFDM receiving mode can be performed when a data frame that carries a legacy physical-layer preamble is received, to correctly receive the data frame that carries the legacy physical-layer preamble, and the legacy physical-layer preamble can be parsed.

Implementation manner 2: The AP adds indication information to a current beacon frame sent to the STA; when receiving the current beacon frame, the STA reads the indication information from the current beacon frame, where the indication information is field information that represents an appearance cycle of a data frame that is within a time period of the current beacon frame and that carries the legacy physical-layer preamble; and the STA determines, according to the field information, a receiving time of the data frame that is within the time period of the current beacon frame and that carries the legacy physical-layer preamble.

Specifically, a field for indicating a data frame that carries a legacy physical-layer preamble is added to a beacon frame. For example, referring to a field format (field name: Legacy Preamble Interval, legacy preamble interval, which may also be referred to as a legacy physical-layer preamble interval) shown in Table 1, the field in Table 1 indicates a quantity of OFDMA frames (Number of OFDMA Frames), and a quantity of interval data frames that do not carry the legacy physical-layer preamble and that are in the beacon frame are used as an appearance interval of the legacy physical-layer preamble. Certainly, another field format may also be added to the beacon frame, to limit an appearance cycle of the legacy physical-layer preamble, which is not limited by the present invention.

TABLE 1

| Legacy Preamble Interval | |
|---|---|
| Number of OFDMA Frames | TBD |

If the field format in Table 1 indicates that a quantity of data frames that do not carry the legacy physical-layer preamble is equal to 3, refer to FIG. 2 for a form of a generated data frame, where three data frames that do not carry the legacy physical-layer preamble are directly used as an interval between two data frames that carry the legacy physical-layer preamble.

Therefore, it may be implemented that, when the STA receives each beacon frame, the STA can learn an appearance cycle of the legacy physical-layer preamble within a time period of the beacon frame, so that the STA can receive, at a determined receiving time of each data frame that carries the legacy physical-layer preamble and according to indication information, the data frame that carries the legacy physical-layer preamble, and parse the legacy physical-layer preamble when receiving the data frame that carries the legacy physical-layer preamble.

Implementation manner 3: A receiving time of a next data frame that carries the legacy physical-layer preamble is indicated according to signaling information sent by the AP. Specifically, the signaling information is indication information sent by the AP when the AP sends a current data frame that carries the legacy physical-layer preamble to the STA, and the indication information is specifically a quantity of data frames that do not carry the legacy physical-layer preamble and that are used as an interval between the next data frame that carries the legacy physical-layer preamble and the current data frame that carries the legacy physical-layer preamble. The STA receives the signaling information sent by the AP, and then the STA determines, according to the quantity, which is in the signaling information, of the data frames that do not carry the legacy physical-layer preamble, the receiving time of the next data frame that carries the legacy physical-layer preamble.

Figure 3:
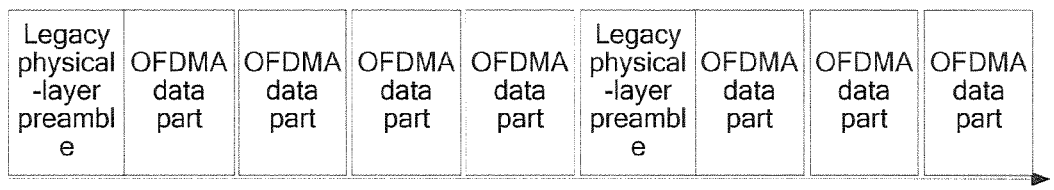
FIG. 3 is a schematic diagram of OFDMA data according to Embodiment 1 of the present invention.

Optionally, the signaling information may be information in physical-layer signaling. That is, in the physical-layer signaling, several bits are used to indicate a quantity of data frames that do not carry the legacy physical-layer preamble and that are received after the current data frame that carries the legacy physical-layer preamble. For example, three bits may be used to indicate zero to seven frames. For example, when the AP sends a first data frame that carries the legacy physical-layer preamble, three bits in first physical-layer signaling that is sent are "011", and in this case, an interval between a second data frame that is received by the STA and that carries the legacy physical-layer preamble and the currently received first data frame that carries the legacy physical-layer preamble is three data frames that do not carry the legacy physical-layer preamble. Three bits in second physical-layer signaling that is received are 010, which indicates that an interval between a third received data frame that carries the legacy physical-layer preamble and the second data frame that carries the legacy physical-layer preamble is three data frames that do not carry the legacy physical-layer preamble. Refer to FIG. 3 for a form of a data frame generated by the AP.

By means of the implementation manner 3, it may be implemented that the STA can learn, according to all signaling information that is received, a receiving time of each data frame that carries the legacy physical-layer preamble, so that switching to an OFDM receiving mode can be performed at the determined receiving time of each data frame that carries the legacy physical-layer preamble.

Implementation manner 4: Each data frame sent by the AP carries one fixed information bit; the AP indicates, according to the fixed information bit in a current data frame that is received, whether a next data frame carries the legacy physical-layer preamble; and when receiving the current data frame, the STA reads a value of the fixed information bit in the current data frame, and determines, according to the value of the fixed information bit, whether the next data frame carries the legacy physical-layer preamble.

Specifically, a value "1" of the fixed information bit may be used to indicate that the next data frame carries the legacy physical-layer preamble, and a value "0" of the fixed information bit may be used to indicate that the next data frame does not carry the legacy physical-layer preamble. Whether the next data frame carries the legacy physical-layer preamble may also be indicated by whether a state of the next data frame changes relative to the current data frame, where the state of the next data frame refers to whether the legacy physical-layer preamble is carried. For example, an example in which a data frame does not carry the legacy physical-layer preamble by default is used. If the fixed information bit indicates that a state of a next data frame does not change, it indicates that the next data frame does not carry the legacy physical-layer preamble; on the contrary, if fixed information bit indicates that a state of a next data frame changes, the next data frame carries the legacy physical-layer preamble.

Therefore, it may be implemented that a state of each data frame can be learned according to a fixed information bit in a previous data frame that is received, so that a data frame that carries the legacy physical-layer preamble can be received when a receiving time of each data frame that carries the legacy physical-layer preamble is determined, and the legacy physical-layer preamble can be parsed when the data frame that carries the legacy physical-layer preamble is received.

In the prior art, an AP indicates a length of a current TXOP (Transmit Opportunity, transmit opportunity) by using frame length information in a legacy physical-layer preamble (Legacy Preamble), where the frame length information is in a field "L-SIG" in legacy signaling in the legacy physical-layer preamble; a receiving end acquires the length of the current TXOP according to the frame length information and rate information that are in the legacy physical-layer preamble. It can be seen that, in the solution in the prior art, a data frame is not improved, and each data frame needs to carry a legacy physical-layer preamble; therefore the transmission efficiency cannot be improved, and the transmission efficiency is relatively low in an OFDMA scenario. However, in technical solutions in the present invention, some data frames in OFDMA data that is sent by an AP carry a legacy physical-layer preamble, so that a legacy STA can parse these data frames that carry the legacy physical-layer preamble, and therefore compatibility with the legacy STA is achieved; meanwhile, other data frames in the transmitted OFDMA data do not carry the legacy physical-layer preamble, and it takes less time to transmit the data frames that do not carry the legacy physical-layer preamble, so that a time resource occupied during data frame transmission can be reduced, and therefore the transmission efficiency in an OFDMA scenario is improved.

Further, in a specific implementation process, it is determined, according to indication information, that a time channel that needs to carry a legacy physical-layer preamble may be used to send an uplink data frame. In this case, the AP sends the indication information in a downlink transmission process, to indicate a sending time when the STA sends a data frame that carries the legacy physical-layer preamble, or a sending time for sending a data frame that carries the legacy physical-layer preamble is agreed by the AP and the STA, and the STA adds the legacy physical-layer preamble in front of an uplink data frame that is sent on a time channel in which the sending time is located. Specifically, at a time when the legacy physical-layer preamble needs to be carried, the time channel is used to send an uplink OFDMA data frame, and multiple STAs may send uplink data frames to the AP. Therefore, the AP needs to specify one STA among the multiple STAs to add the legacy physical-layer preamble to an uplink data frame that is sent at this time. In a specific implementation process, the AP specifies, in a downlink transmission process, a STA that sends an uplink OFDMA data frame that carries the legacy physical-layer preamble. It can be seen that, by means of the implementation solutions in the present invention, it may also be implemented that indication information sent by the AP to the STA indicates a data frame, in uplink OFDMA data frames, that carries the legacy physical-layer preamble.

The STA in this embodiment of the present invention is a non-legacy STA at a destination receiving end or a non-destination receiving end. The non-legacy STA has two operating modes. One is an OFDMA receiving mode in which a received OFDMA data frame is parsed in a frame parsing manner corresponding to a format of a data frame that does not carry a legacy physical-layer preamble; when a data frame that does not carry the legacy physical-layer preamble is received in the OFDMA receiving mode, parsing can be performed. The other is an OFDM receiving mode in which a received legacy physical-layer preamble is parsed in a frame parsing manner corresponding to a format of a data frame that carries the legacy physical-layer preamble; in addition, after the legacy physical-layer preamble is correctly parsed, switching to the OFDMA receiving mode is further performed, to parse an OFDMA data part after the legacy physical-layer preamble. However, when a data frame that does not carry the legacy physical-layer preamble is received, parsing cannot be performed. If a data frame that needs to be received currently by the non-legacy STA is a data frame that does not carry the legacy physical-layer preamble, the non-legacy STA works in the OFDMA receiving mode, and keeps, in the OFDMA receiving mode, monitoring a channel. When the non-legacy STA learns, according to indication information, that a next data frame needing to be received is a data frame that carries the legacy physical-layer preamble, the non-legacy STA switches, before a receiving time of the data frame that carries the legacy physical-layer preamble, a receiving mode of the non-legacy STA to the OFDM receiving mode.

Optionally, compared with the non-legacy STA, a legacy STA can perform parsing only when a data frame that carries a legacy physical-layer preamble is received. Therefore when receiving a data frame that does not carry the legacy physical-layer preamble, the legacy STA considers that a channel is busy, and the legacy STA keeps listening on the channel; when receiving a data frame that carries the legacy physical-layer preamble, the legacy STA parses the legacy physical-layer preamble, learns an occupation time of the current channel, and related information of the currently transmitted data frame, such as frame length information and transmission rate information, and may not listen on the channel any longer within the occupation time, which effectively reduces power of the STA.

Embodiment 2

Figure 4:
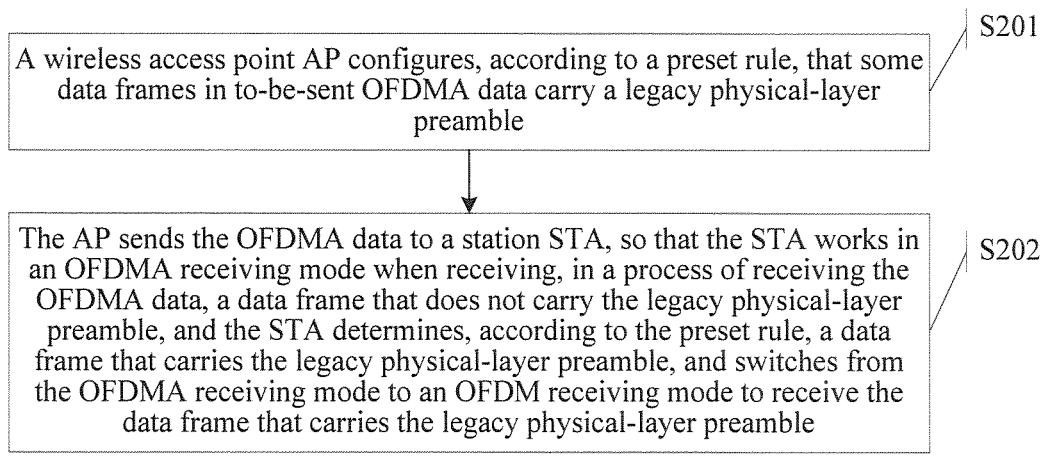
FIG. 4 is a flowchart of an information sending method according to Embodiment 2 of the present invention.

Based on a same inventive concept, this embodiment of the present invention provides an information sending method. Referring to FIG. 4, FIG. 4 is a flowchart of an information sending method according to Embodiment 2 of the present invention. The method includes the following steps:

S201: A wireless access point AP configures, according to a preset rule, that some data frames in to-be-sent OFDMA data carry a legacy physical-layer preamble.

In S201, an important principle for determining which OFDMA data frames carry the legacy physical-layer preamble is to refer to a quantity of legacy STAs in a current BSS (Basic Service Set, basic service set). A main purpose of carrying a legacy physical-layer preamble is to prevent a legacy STA from listening on a channel over a long period of time, and after detecting the legacy physical-layer preamble by means of listening, the legacy STA may learn an occupation time of the channel in the future, and does not listen on the channel any longer within the occupation time. Therefore, the preset rule may be: an average appearance frequency of the legacy physical-layer preamble should be greater than a threshold $\varepsilon$, where $0<\varepsilon<1$. The threshold $\varepsilon$ may be a monotonically increasing function of the quantity of the legacy STAs in the current BSS. That is, more legacy STAs in the current BSS indicate larger $\varepsilon$.

S202: The AP sends the OFDMA data to a station STA, so that the STA works in an OFDMA receiving mode when receiving, in a process of receiving the OFDMA data, a data frame that does not carry the legacy physical-layer preamble, and the STA determines, according to the preset rule, a data frame that carries the legacy physical-layer preamble, and switches from the OFDMA receiving mode to an OFDM receiving mode to receive the data frame that carries the legacy physical-layer preamble.

In a specific implementation process, the preset rule may be a rule, which is agreed by the AP and the STA, for carrying the legacy physical-layer preamble, or may be indication information generated by the AP.

Optionally, when the preset rule is the rule, which is agreed by the AP and the STA, for carrying the legacy physical-layer preamble, the AP pre-configures, in the AP, the rule agreed by the AP and the STA for carrying the legacy physical-layer preamble; and the AP configures, according to the rule that is pre-configured in the AP and that is for carrying the legacy physical-layer preamble, a data frame that carries the legacy physical-layer preamble.

Optionally, when the preset rule is the indication information generated by the AP, the AP configures that some data frames in to-be-sent OFDMA data carry the legacy physical-layer preamble; and the AP generates the indication information that is used to indicate a receiving time of each data frame that carries the legacy physical-layer preamble, and sends the indication information to the STA.

In addition, the AP may notify a non-legacy STA of mode switching information, and instructs the non-legacy STA to directly switch between a mode in which some OFDMA data frames carry the legacy physical-layer preamble and a mode in which all OFDMA data frames carry the legacy physical-layer preamble. The mode switching information may be carried in a dedicated mode switching frame or a related field or an information bit in an ordinary data frame. After receiving the mode switching information, the non-legacy STA switches between the two modes: the mode in which some OFDMA data frames carry the legacy physical-layer preamble and the mode in which all OFDMA data frames carry the legacy physical-layer preamble.

Embodiment 3

Figure 5:
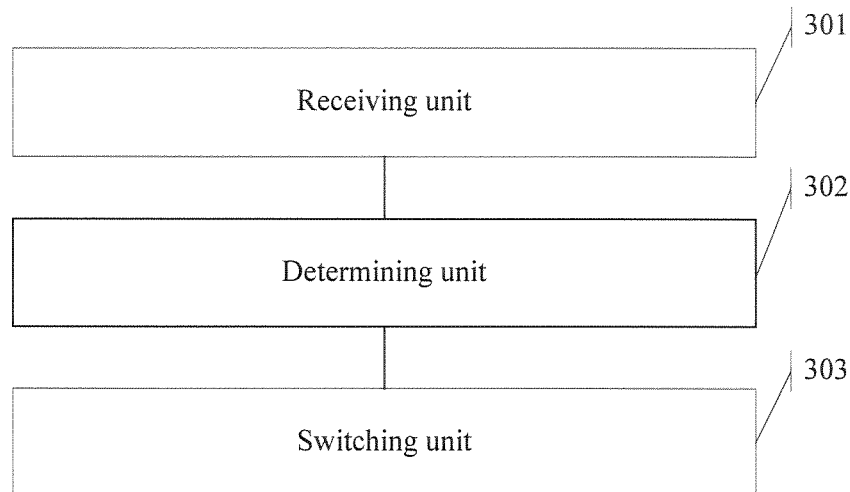
FIG. 5 is a module diagram of a receiving apparatus according to Embodiment 3 of the present invention.

Based on a same inventive concept, this embodiment of the present invention provides a receiving apparatus. Referring to FIG. 5, FIG. 5 is a module diagram of a receiving apparatus according to Embodiment 3 of the present invention. The receiving apparatus includes the following structure:

a receiving unit 301, configured to receive, in a transmit opportunity TXOP phase, orthogonal frequency division multiple access OFDMA data that is from a wireless access point AP, where some data frames in the OFDMA data carry a legacy physical-layer preamble, and in a process of receiving the OFDMA data, the receiving unit 301 works in an OFDMA receiving mode when receiving a data frame that does not carry the legacy physical-layer preamble;

a determining unit 302, configured to acquire data frames received by the receiving unit 301, and determine, according to a preset rule, a data frame that carries the legacy physical-layer preamble; and a switching unit 303, configured to: when the determining unit 302 determines the data frame that carries the legacy physical-layer preamble, switch the receiving unit 301 from the OFDMA receiving mode to an OFDM receiving mode to receive the data frame that carries the legacy physical-layer preamble.

Optionally, the determining unit 302 is specifically configured to:

determine, according to indication information sent by the AP, the data frame that carries the legacy physical-layer preamble.

Optionally, the determining unit 302 is specifically configured to:

determine, according to a rule, which is pre-configured in the determining unit 302, for carrying the legacy physical-layer preamble, the data frame that carries the legacy physical-layer preamble.

Optionally, the determining unit 302 is specifically configured to:

when receiving a current data frame that carries a legacy physical-layer preamble, read frame length information and rate information from the current legacy physical-layer preamble, where the read frame length information and rate information are indication information that indicates a next data frame that carries a legacy physical-layer preamble; and calculate, according to the frame length information and the rate information, a receiving time of the next data frame that carries the legacy physical-layer preamble.

Optionally, the determining unit 302 is specifically configured to:

when receiving a current beacon frame, read indication information from the current beacon frame, where the indication information is field information that represents an appearance cycle of a data frame that is within a time period of the current beacon frame and that carries the legacy physical-layer preamble; and determine, according to the field information, a receiving time of the data frame that is within the time period of the current beacon frame and that carries the legacy physical-layer preamble.

Optionally, the determining unit 302 is specifically configured to:

receive signaling information that is sent by the AP when the AP sends a current data frame that carries the legacy physical-layer preamble, where the signaling information is signaling information that is sent by the AP to the receiving unit 301 when the AP sends the current data frame that carries the legacy physical-layer preamble, and the signaling information includes indication information of a receiving time of a next data frame that carries the legacy physical-layer preamble; and acquire the signaling information from the receiving unit 301, read the indication information from the signaling information, and determine, according to the indication information, the receiving time of the next data frame that carries the legacy physical-layer preamble.

Optionally, the determining unit 302 is specifically configured to:

when receiving a current data frame, read indication information from a fixed information bit of the current data frame, where the indication information is a state value of the fixed information bit; and determine, according to the state value of the fixed information bit, whether a next data frame carries the legacy physical-layer preamble, so as to determine, according to a result of the determining, a receiving time of the next data frame that carries the legacy physical-layer preamble.

Embodiment 4

Figure 6:
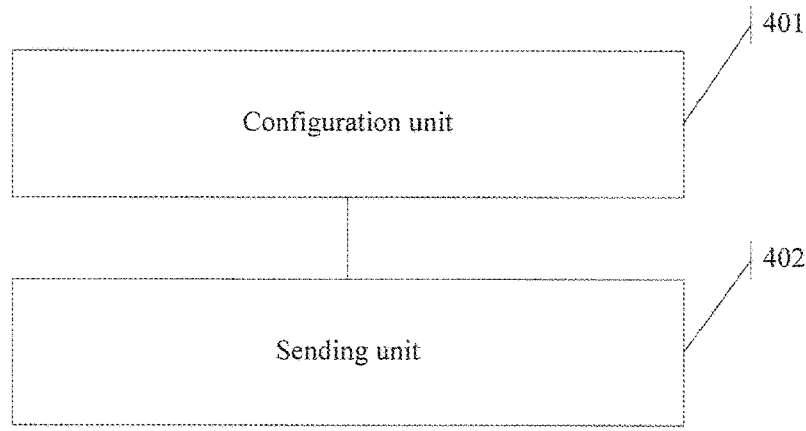
FIG. 6 is a module diagram of a sending apparatus according to Embodiment 4 of the present invention.

Based on a same inventive concept, this embodiment of the present invention provides a sending apparatus. Referring to FIG. 6, FIG. 6 is a module diagram of a sending apparatus according to Embodiment 4 of the present invention. The sending apparatus includes the following structure:

a configuration unit 401, configured to configure, according to a preset rule, that some data frames in to-be-sent OFDMA data carry a legacy physical-layer preamble; and a sending unit 402, configured to send the OFDMA data to a station STA, so that the STA works in an OFDMA receiving mode when receiving, in a process of receiving the OFDMA data, a data frame that does not carry the legacy physical-layer preamble, and the STA determines, according to the preset rule, a data frame that carries the legacy physical-layer preamble, and switches from the OFDMA receiving mode to an OFDM receiving mode to receive the data frame that carries the legacy physical-layer preamble.

Optionally, the configuration unit 401 is specifically configured to:

configure, according to a rule, which is pre-configured in the AP, for carrying the legacy physical-layer preamble, the data frames that carry the legacy physical-layer preamble.

Optionally, the configuration unit 401 is specifically configured to:

configure that some data frames in the to-be-sent OFDMA data carry the legacy physical-layer preamble; and generate indication information of a receiving time of each data frame that carries the legacy physical-layer preamble, and send the indication information to the STA.

Optionally, the preset rule further includes: an average appearance frequency of the data frames that carry the legacy physical-layer preamble is greater than a frequency threshold.

Embodiment 5

Figure 7:
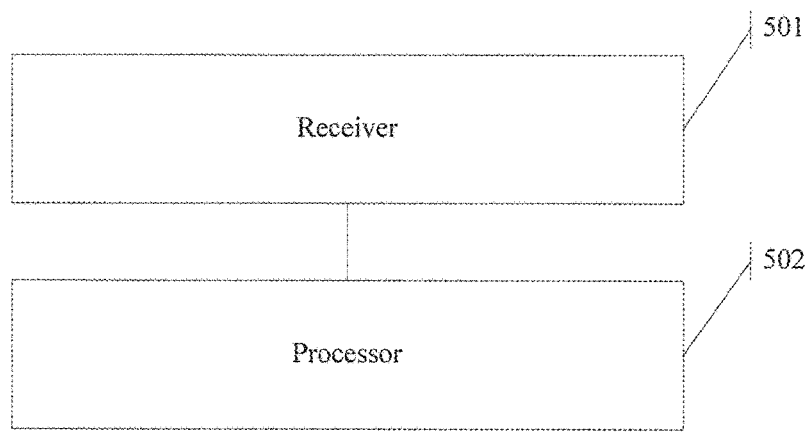
FIG. 7 is a frame diagram of a STA according to Embodiment 5 of the present invention.

Based on a same inventive concept, this embodiment of the present invention provides a station STA. Referring to FIG. 7, FIG. 7 is a frame diagram of a STA according to Embodiment 5 of the present invention. The STA includes the following structure:

a receiver 501, configured to receive, in a transmit opportunity TXOP phase, orthogonal frequency division multiple access OFDMA data that is from a wireless access point AP, where some data frames in the OFDMA data carry a legacy physical-layer preamble, and in a process of receiving the OFDMA data, the receiver 501 works in an OFDMA receiving mode when receiving a data frame that does not carry the legacy physical-layer preamble; and a processor 502, configured to: determine, according to a preset rule, a data frame that carries the legacy physical-layer preamble, and switch from the OFDMA receiving mode to an OFDM receiving mode to receive the data frame that carries the legacy physical-layer preamble.

Optionally, the processor 502 is specifically configured to:

determine, according to indication information sent by the AP, the data frame that carries the legacy physical-layer preamble.

Optionally, the processor 502 is specifically configured to:

determine, according to a rule, which is pre-configured in the processor 502, for carrying the legacy physical-layer preamble, the data frame that carries the legacy physical-layer preamble.

Optionally, the processor 502 is specifically configured to:

when receiving a current data frame that carries a legacy physical-layer preamble, read frame length information and rate information from the current legacy physical-layer preamble, where the read frame length information and rate information are indication information that indicates a next data frame that carries a legacy physical-layer preamble; and calculate, according to the frame length information and the rate information, a receiving time of the next data frame that carries the legacy physical-layer preamble.

Optionally, the processor 502 is specifically configured to:

when receiving a current beacon frame, read indication information from the current beacon frame, where the indication information is field information that represents an appearance cycle of a data frame that is within a time period of the current beacon frame and that carries the legacy physical-layer preamble; and determine, according to the field information, a receiving time of the data frame that is within the time period of the current beacon frame and that carries the legacy physical-layer preamble.

Optionally, the processor 502 is specifically configured to:

receive signaling information that is sent by the AP when the AP sends a current data frame that carries the legacy physical-layer preamble, where the signaling information is signaling information that is sent by the AP to the receiver 501 when the AP sends the current data frame that carries the legacy physical-layer preamble, and the signaling information includes indication information of a receiving time of a next data frame that carries the legacy physical-layer preamble; and acquire the signaling information from the receiver 501, read the indication information from the signaling information, and determine, according to the indication information, the receiving time of the next data frame that carries the legacy physical-layer preamble.

Optionally, the processor 502 is specifically configured to:

when receiving a current data frame, read indication information from a fixed information bit of the current data frame, where the indication information is a state value of the fixed information bit; and determine, according to the state value of the fixed information bit, whether a next data frame carries the legacy physical-layer preamble, so as to determine, according to a result of the determining, a receiving time of the next data frame that carries the legacy physical-layer preamble.

Embodiment 6

Based on a same inventive concept, this embodiment of the present invention provides a wireless access point AP.

Figure 8:
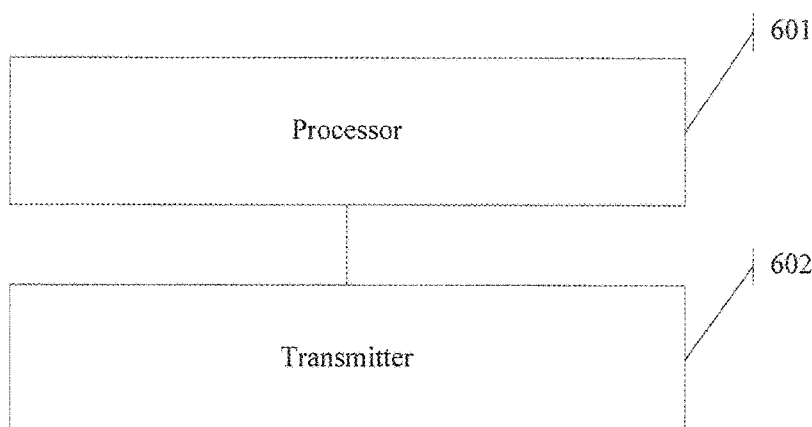
FIG. 8 is a frame diagram of an AP according to Embodiment 6 of the present invention.

Referring to FIG. 8, FIG. 8 is a frame diagram of an AP according to Embodiment 6 of the present invention. The AP includes the following structure:

a processor 601, configured to configure, according to a preset rule, that some data frames in to-be-sent OFDMA data carry a legacy physical-layer preamble; and a transmitter 602, configured to send the OFDMA data to a station STA, so that the STA works in an OFDMA receiving mode when receiving, in a process of receiving the OFDMA data, a data frame that does not carry the legacy physical-layer preamble, and the STA determines, according to the preset rule, a data frame that carries the legacy physical-layer preamble, and switches from the OFDMA receiving mode to an OFDM receiving mode to receive the data frame that carries the legacy physical-layer preamble.

Optionally, the processor 601 is specifically configured to:

configure, according to a rule, which is pre-configured in the processor 601, for carrying the legacy physical-layer preamble, the data frames that carry the legacy physical-layer preamble.

Optionally, the processor 601 is specifically configured to:

configure that some data frames in the to-be-sent OFDMA data carry the legacy physical-layer preamble; and generate indication information of a receiving time of each data frame that carries the legacy physical-layer preamble, and send the indication information to the STA.

Optionally, the preset rule further includes: an average appearance frequency of the data frames that carry the legacy physical-layer preamble is greater than a frequency threshold.

The foregoing embodiments may be separately implemented, or may be implemented in combination, which may be selected by a person skilled in the art according to an actual need.

Various variation forms in the information sending method in Embodiment 2 may be known according to various variation manners in the information receiving method in Embodiment 1. In addition, the specific examples in Embodiment 1 and Embodiment 2 also apply to the apparatus and the device in this embodiment. According to the foregoing detailed description of the method, a person skilled in the art can clearly know implementation methods of the apparatus and the device in this embodiment. Therefore, for simplicity of the specification, details are not described herein again.

The following technical effects can be achieved by using one or more embodiments of the present invention:

By means of the technical solutions provided in the embodiments of the present invention, in continuous transmission, some data in OFDMA data sent by an AP carries a legacy physical-layer preamble, where some data frames carry the legacy physical-layer preamble, so that a legacy STA can parse these data frames that carry the legacy physical-layer preamble, and therefore compatibility with the legacy STA is achieved, and overheads of receive power is not obviously increased. In addition, some data frames do not carry the legacy physical-layer preamble, which can reduce a time resource that is occupied during data frame transmission, increasing the transmission efficiency in an OFDMA scenario. The STA determines, according to a preset rule, a data frame that carries the legacy physical-layer preamble and switches to an OFDM receiving mode, and therefore can receive data frames that carry the legacy physical-layer preamble and data frames that do not carry the legacy physical-layer preamble.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. An information receiving method, comprising:

receiving, by a station (STA) in a transmit opportunity (TXOP) phase, orthogonal frequency division multiple access (OFDMA) data from a wireless access point (AP), wherein some data frames in the OFDMA data carry a legacy physical-layer preamble; and in response to receiving the OFDMA data:

working, by the STA, in an OFDMA receiving mode when receiving a data frame that does not carry the legacy physical-layer preamble, determining, by the STA according to a preset rule, a data frame that carries the legacy physical-layer preamble, and switching from the OFDMA receiving mode to an orthogonal frequency division multiplexing (OFDM) receiving mode to receive the data frame that carries the legacy physical-layer preamble, wherein determining, by the STA according to the preset rule, the data frame that carries the legacy physical-layer preamble comprises:

determining, by the STA according to indication information sent by the AP, the data frame that carries the legacy physical-layer preamble.

2. The method according to claim 1, wherein determining, by the STA according to indication information sent by the AP, the data frame that carries the legacy physical-layer preamble comprises:

when receiving a current data frame that carries a legacy physical-layer preamble, reading, by the STA, frame length information and rate information from a current legacy physical-layer preamble, wherein the read frame length information and rate information are indication information that indicates a next data frame that carries a legacy physical-layer preamble; and calculating, by the STA, according to the frame length information and the rate information, a receiving time of the next data frame that carries the legacy physical-layer preamble.

3. The method according to claim 1, wherein determining, by the STA according to indication information sent by the AP, the data frame that carries the legacy physical-layer preamble comprises:

when receiving a current beacon frame, reading, by the STA, indication information from the current beacon frame, wherein the indication information is an appearance cycle of the data frame that carries the legacy physical-layer preamble; and determining, by the STA according to the appearance cycle, a receiving time of the data frame that is within a time period of the current beacon frame and that carries the legacy physical-layer preamble.

4. The method according to claim 1, wherein determining, by the STA according to indication information sent by the AP, the data frame that carries the legacy physical-layer preamble comprises:

receiving, by the STA, signaling information from the AP when the AP sends a current data frame that carries the legacy physical-layer preamble, wherein the signaling information comprises indication information of a receiving time of a next data frame that carries the legacy physical-layer preamble; and reading, by the STA, the indication information from the signaling information, and determining, according to the indication information, the receiving time of the next data frame that carries the legacy physical-layer preamble.

5. The method according to claim 1, wherein determining, by the STA according to indication information sent by the AP, the data frame that carries the legacy physical-layer preamble comprises:

when receiving a current data frame, reading, by the STA, indication information from a fixed information bit of the current data frame, wherein the indication information is a state value of the fixed information bit; and determining, by the STA according to the state value of the fixed information bit, whether a next data frame carries the legacy physical-layer preamble, so as to determine, according to a result of the determining according to the state value of the fixed information bit, a receiving time of the next data frame that carries the legacy physical-layer preamble.

6. An information sending method, comprising:

configuring, by a wireless access point (AP) according to a preset rule, that some data frames in to-be-sent orthogonal frequency division multiple access (OFDMA) data carry a legacy physical-layer preamble;

sending, by the AP, the OFDMA data to a station (STA);

in response to receiving the OFDMA data:

working, by the STA, in an OFDMA receiving mode when receiving a data frame that does not carry the legacy physical-layer preamble, determining, by the STA according to the preset rule, a data frame that carries the legacy physical-layer preamble, and switching from the OFDMA receiving mode to an orthogonal frequency division multiplexing (OFDM) receiving mode to receive the data frame that carries the legacy physical-layer preamble wherein determining, by the STA according to the preset mile, the data frame that carries the legacy physical-layer preamble comprises:

determining, by the STA according to indication information sent by the AP, the data frame that carries the legacy physical-layer preamble.

7. The method according to claim 6, wherein configuring, by the wireless AP according to the preset rule, that some data frames in to-be-sent OFDMA data carry the legacy physical-layer preamble comprises:

configuring, by the AP according to a rule, which is pre-configured in the AP, for carrying the legacy physical-layer preamble, the data frames that carry the legacy physical-layer preamble.

8. The method according to claim 7, wherein configuring, by the wireless AP according to the preset rule, that some data frames in to-be-sent OFDMA data carry the legacy physical-layer preamble comprises:

configuring, by the AP, that some data frames in the to-be-sent OFDMA data carry the legacy physical-layer preamble; and generating, by the AP, indication information of a receiving time of each data frame that carries the legacy physical-layer preamble, and sending the indication information to the STA.

9. The method according to claim 6, wherein determining, by the STA according to indication information sent by the AP, the data frame that carries the legacy physical-layer preamble comprises:

when receiving a current data frame that carries a legacy physical-layer preamble, reading, by the STA, frame length information and rate information from a current legacy physical-layer preamble, wherein the read frame length information and rate information are indication information that indicates a next data frame that carries a legacy physical-layer preamble; and calculating, by the STA, according to the frame length information and the rate information, a receiving time of the next data frame that carries the legacy physical-layer preamble.

10. The method according to claim 6, wherein determining, by the STA according to indication information sent by the AP, the data frame that carries the legacy physical-layer preamble comprises:

when receiving a current beacon frame, reading, by the STA, indication information from the current beacon frame, wherein the indication information is an appearance cycle of the data frame that carries the legacy physical-layer preamble; and determining, by the STA according to the appearance cycle, a receiving time of the data frame that is within a time period of the current beacon frame and that carries the legacy physical-layer preamble.

11. The method according to claim 6, wherein determining, by the STA according to indication information sent by the AP, the data frame that carries the legacy physical-layer preamble comprises:

receiving, by the STA, signaling information from the AP when the AP sends a current data frame that carries the legacy physical-layer preamble, wherein the signaling information comprises indication information of a receiving time of a next data frame that carries the legacy physical-layer preamble; and reading, by the STA, the indication information from the signaling information, and determining, according to the indication information, the receiving time of the next data frame that carries the legacy physical-layer preamble.

12. The method according to claim 6, wherein determining, by the STA according to indication information sent by the AP, the data frame that carries the legacy physical-layer preamble comprises:

when receiving a current data frame, reading, by the STA, indication information from a fixed information bit of the current data frame, wherein the indication information is a state value of the fixed information bit; and determining, by the STA according to the state value of the fixed information bit, whether a next data frame carries the legacy physical-layer preamble and determining, according to a result of the determining according to the state value of the fixed information bit, a receiving time of the next data frame that carries the legacy physical-layer preamble.

13. A station (STA), comprising:

a receiver, configured to receive, in a transmit opportunity (TXOP) phase, orthogonal frequency division multiple access (OFDMA) data that is from a wireless access point (AP), wherein some data frames in the OFDMA data carry a legacy physical-layer preamble, and in a process of receiving the OFDMA data, the receiver works in an OFDMA receiving mode when receiving a data frame that does not carry the legacy physical-layer preamble; and a processor, configured to:
determine, according to indication information sent by the AP, a data frame that carries the legacy physical-layer preamble, and
switch from the OFDMA receiving mode to an orthogonal frequency division multiplexing (OFDM) receiving mode to receive the data frame that carries the legacy physical-layer preamble.

14. The STA according to claim 13, wherein the processor is configured to:

when receiving a current data frame that carries a legacy physical-layer preamble, read frame length information and rate information from a current legacy physical-layer preamble, wherein the read frame length information and rate information are indication information that indicates a next data frame that carries a legacy physical-layer preamble; and calculate, according to the frame length information and the rate information, a receiving time of the next data frame that carries the legacy physical-layer preamble.

15. The STA according to claim 13, wherein the processor is configured to:

when receiving a current beacon frame, read indication information from the current beacon frame, wherein the indication information is field information that represents an appearance cycle of a data frame that is within a time period of the current beacon frame and that carries the legacy physical-layer preamble; and determine, according to the field information, a receiving time of the data frame that is within the time period of the current beacon frame and that carries the legacy physical-layer preamble.

16. The STA according to claim 13, wherein the processor is configured to:

receive signaling information from the AP when the AP sends a current data frame that carries the legacy physical-layer preamble, wherein the signaling information comprises indication information of a receiving time of a next data frame that carries the legacy physical-layer preamble; and acquire the signaling information from the receiver, read the indication information from the signaling information, and determine, according to the indication information, the receiving time of the next data frame that carries the legacy physical-layer preamble.

17. The STA according to claim 13, wherein the processor is configured to:

when receiving a current data frame, read indication information from a fixed information bit of the current data frame, wherein the indication information is a state value of the fixed information bit; and determine, according to the state value of the fixed information bit, whether a next data frame carries the legacy physical-layer preamble, so as to determine, according to a result of the determination according to the state value of the fixed information bit, a receiving time of the next data frame that carries the legacy physical-layer preamble.

* * * * *